Patented Jan. 14, 1947

2,414,427

UNITED STATES PATENT OFFICE 2,414,427

PAINT

Paul Zurcher, Ponca City, Okla., assignor to Continental Oil Company, Ponca City, Okla., a corporation of Delaware No Drawing. Application September 17, 1943,
Serial No. 502,795

4 Claims. (Cl. 106—287)

This invention relates broadly to paints and more particularly to a paint whose chemical and physical properties are improved by the addition of both an aliphatic and an aromatic amine.

The term "paint" as used in this specification and in the appended claims, means any normally liquid composition which dries into a tough, elastic covering in a relatively short time when spread in a thin film. Paints so defined consist either of a vehicle alone, or a combination of a vehicle and a pigment.

The vehicle may be any suitable liquid not comprising or including water. In the presence of water, the amines are immediately converted to ammonium bases which act differently than the unionized amines. Suitable vehicles are drying vegetable oils, such as linseed oil, tung oil, oiticica oil, or Perilla oil; natural or synthetic resins, solutions including chlorinated rubber in suitable solvents; combinations of the above classes of materials; or a solution of cellulose acetate or cellulose nitrate. All of the above vehicles are similar in that they form a hard, dry elastic film when spread on a surface. It makes no difference whether the vehicles dry with or without catalysts, by oxidation, by polymerization, or both, or by simple evaporation of a volatile solvent.

Pigments are defined as the fine solid particles which, insoluble in the vehicle, are added to supply color to the paint and to render it more durable. I do not consider asphaltic or bituminous materials from any source as pigments.

My co-pending application Serial No. 492,129, filed June 24, 1943, discloses broadly the beneficial effect which amines generally have upon paints.

My co-pending application Serial No. 423,054, filed December 15, 1941, discloses the beneficial and improved results obtained when a cyclic or heterocyclic amine is added to a paint.

I have now discovered that if small amounts of both an aliphatic amine and a cyclic amine are dissolved in the vehicle of the paint, unexpected and improved results are obtained that are not achieved by either of these compounds alone. To obtain these improved results, however, the amines must be dissolved in the vehicle and by this I mean the complete homogeneous dispersion of the amines in the vehicle.

Amines have also been used as flushing agents in the manufacture of paint pigments to facilitate the transfer of the pigment from an aqueous slurry into an organic vehicle. This use of amines should not be confused with the instant invention since flushing agents are highly polar, have molecular weight of from 250 to 350 and must be cation-active in order to be effective. Their activity is due to the formation of ammonium bases in the presence of water. For instance, secondary amines react in the following manner:

$$RHN + H_2O \rightleftharpoons (RHN_2OH) \rightleftharpoons RHN_2^+ + H_2O^-$$

When amines are used in nonaqueous paints their action is entirely different.

I am aware that others have incorporated amines into paints by combining them under enormous pressure with the paint pigments. However, this method of adding the amines does not produce the results achieved when the additive is dissolved in the vehicle. When the amines are added by sorption with the pigments they have no influence on the physical or chemical properties of the paint, nor do they change the film after it has dried. They are firmly associated with the pigments and are released from the pigments to protect the covered surface only after the paint film has ruptured. Until this occurs they are merely held as inert constituents of the paint.

Each group of amines imparts peculiar and characteristic properties to the paint. They may change its consistency, its gloss, its tendency to check, or its brushing quality. The aromatic amines generally increase the viscosity of a paint containing a synthetic vehicle. Aliphatic amines, with the exception of alkanol amines, affect the viscosity only slightly but improve brushing quality and generally reduce tendency to checking. Surprisingly enough, however, when these two types of amines are added together their effect on the paint is not merely the additive effect that would be expected. Instead entirely new and unexpected results are obtained. By adding to the paint at least two amines, one an aliphatic amine and the other a cyclic amine, it is possible to eliminate undesirable features of the paint without appreciably changing other desirable properties. For example, it may happen that an aliphatic amine alone will improve the brushing quality of a paint, but it will also increase its tendency to check upon weathering. Moreover, the addition of a cyclic amine alone to the same paint will produce the desired consistency, but it will also increase the tendency to check upon weathering. If, however, both an aliphatic and an aromatic amine are added to the paint, the checking tendency is entirely suppressed without in any manner decreasing the improvement in consistency and brushing quality.

I am also aware that amines have been unsuccessfully used as anticorrosives in nonaqueous paint compositions. Amines must be used in large quantities if their anticorrosive properties are manifested. But when used in sufficiently large quantities to be anticorrosive, they so adversely affect other properties of the paint that they cannot be used. An excess of the various amines adversely affects the physical properties in different ways. For example, they may soften or harden the coating, or they may make it more brittle. An excess of the amines also adversely affects the chemical behavior of a paint. They may affect its age, its resinification, and formation of film. They usually produce a porous film by causing saponification of any resins present and swelling of the soaps. When this occurs the paint film is of more or less hygroscopic character, thus allowing water to pass through and accelerate corrosion instead of preventing it. Accordingly, it must be appreciated that amines must be added to nonaqueous paints in amounts within well defined critical limits if they are to advantageously affect its physical and chemical properties.

The total amount of amines necessary to obtain the desired effect on paints may be as low as 0.05 per cent or as high as 2.5 per cent. The average amount is approximately 1 per cent. The ratio of the two types of amines may vary anywhere from 95 parts by weight of the one to 5 parts by weight of the other. Stated in other words, the ratio of the cyclic amine to the aliphatic amine in the combination of amines ranges from 5% to 95% by weight of the cyclic amine to a range of from 95% to 5% by weight of the aliphatic amine. It is easy to find by test the most favorable ratio.

I prefer amines having a vapor pressure of less than atmospheric at 130° F. in order to prevent their evaporation and consequent toxic hazards. A few examples of suitable combinations of amines are:

Dibutyl amine with aniline
Triamyl amine with ortho-toluidine
Trihexyl amine with meta-toluidine
Diethyl-amino ethanol with mono-ethyl aniline
Dibutyl amino ethanol with mesidine
Tri-is-o-amyl amine with dimethyl aniline
Dibutyl ethanol amine with benzyl amine
Diheptyl amine with para-toluidine In these amines the hydrogen atoms may be replaced by halogens, aliphatic side chains, or aromatic of heterocyclic radicals.

From the foregoing it will be apparent that I have discovered a very convenient means of changing certain properties of paints without the necessity of reformulation.

Other advantages derived from the presence of the combined amines in the paint will be apparent from the typical examples cited below.

*Example 1.*—For this test, a primer comprising linseed oil, a thinner, a drier, and red iron oxide pigment was selected. This paint was defective in that it developed pinholes when exposed to weathering on steel panels for a relatively short time. The film dropped from the surface in very fine slivers until the metal finally was completely exposed. In making the test four panels were coated with different samples of the paint. The first panel was coated with a sample of the paint containing no additive. The second panel was coated with a sample containing 0.5 per cent by weight of triamyl amine. The third panel was coated with a sample of the paint containing 0.3 per cent by weight of orthochloro aniline. The fourth panel was coated with a sample of the paint containing 0.3 per cent by weight of triamyl amine plus 0.25 per cent by weight of orthochloro aniline. After these four panels had been exposed to the atmosphere for 123 days they were carefully examined. The paint film on the first panel was full of pinholes. The paint film on the second panel broke down in a similar manner. The film of paint on the third panel had failed more rapidly than the paint which contained no amine at all. As distinguished from the paints on the first three panels, the paint film on the fourth panel was almost intact. Only a few pinholes were observed.

Identical results were obtained with double-coated panels exposed in an accelerated weathering machine for 569 hours.

*Example 2.*—This example illustrates the effect of the combined amines on a varnish. The varnish selected for the test consisted of medium length Congo resin linseed oil (47%), thinner and drier (53%), and was defective in that it peeled badly when exposed to weathering.

A first panel was coated with a sample of the varnish containing no addition agent. A second panel was coated with a sample of the varnish to which had been added 0.5 per cent dibutyl amine. The varnish applied to a third panel contained 0.4 per cent aniline, while a fourth panel was coated with a varnish containing 0.3 per cent dibutyl amine plus 0.2 per cent aniline. These panels were first exposed in an accelerated weathering machine for 162 hours, followed by exposure to the atmosphere for 73 days. During this treatment, the original varnish on the first panel had peeled off from 10 per cent of the surface, and rusting had begun in spots. The film of varnish on the second panel had disappeared from four-fifths of its surface while streaks of rust were visible on the exposed surface of the panel. One-third of the varnish film had peeled from the third panel and little rust had developed. The fourth panel had developed the least checking. None of the film had peeled off and no rust could be detected. It is evident that the addition of both aliphatic and cyclic amines to the varnish produced an entirely different effect than that obtained from either of these amines alone.

*Example 3.*—A gray enamel comprising 69 per cent vehicle (10.6 per cent resins, 36.4 per cent vegetable oils, and 53 per cent drier and volatiles) and 31 per cent pigment (99 per cent titanated lithopone and 1 per cent carbon black), was next tested. This enamel had only fair gloss, was difficult to brush out, left brush marks, and developed orange peel upon drying. The addition of one-half of one per cent by weight of triamyl amine slightly reduced the brush marks and orange peel but had no effect on the gloss. Three-tenths of one per cent of ortho-toluidine improved the gloss somewhat without producing any other change. An outstanding improvement was obtained by the addition to the enamel of 0.3 per cent triamyl amine plus 0.2 per cent ortho-toluidine. Brushing was easy, gloss much greater, there were no brush marks, orange peel was suppressed, and the film became tougher than without addition or with the addition of either one of the amines alone.

*Example 4.*—For this test a black enamel was selected which comprised 75 per cent vehicle (linseed oil modified glyceryl phthalic resins 50 per cent and thinner and drier 50 per cent) and 25 per cent pigment (carbon black and ferro-ferri-cyanide blue). The enamel was very difficult to brush out although very fluid. One-half of one per cent by weight of tributyl amine added to the enamel increased its fluidity and still further increased the difficulty of brushing. Moreover, the paint showed brush marks plainly, an undesirable characteristic it did not have before the amine was added. Three-tenths of one per cent by weight of orthotoluidine added to the enamel eliminated the bad working quality but did not make it more viscous. The enamel still was defective in that it was too fluid. Surprisingly enough, however, when 0.25 per cent dibutyl amine plus 0.25 per cent ortho-toluidine had been added to the enamel all the objectionable properties of the enamel were corrected. Its body was improved, it brushed easily, and its gloss was excellent.

*Example 5.*—The exterior paint selected for this test had the following composition: Vehicle 37 per cent (linseed oil 90 per cent and Japan drier 10 per cent) and pigment 63 per cent (titanox 70 per cent and zinc oxide 30 per cent). This paint was heavy, stiff in the brush, and could not be spread out evenly because of complete lack of flow. The addition of 0.45 per cent di-n-butyl amino ethanol improved brushing considerably without affecting the lack of flow. The addition of 0.5 per cent meta-toluidine rendered the paint thinner but the deep brush groves remained when it was brushed onto a surface. However, when both of these amines were present in the paint in the same proportions, the flow was much improved; and as a consequence, hiding was much more even.

Having thus described my invention, I claim:

1. A paint composition comprising an organic vehicle which upon drying forms a hard, thin, impervious film, a pigment, an aliphatic amine and a cyclic amine, each of said amines having a vapor pressure less atmospheric at 130° F. and being present in a combined amount of from .05% to 2.5% by weight of the paint, said amines being completely and homogeneously dispersed in the vehicle, said combined amines serving to improve the consistency and brushing qualities of the paint and also serving to suppress any checking tendency of the paint, the ratio of the cyclic amine to the aliphatic amine in the combination of amines being from 5% to 95% by weight of the former to 95% to 5% by weight of the latter.

2. A paint composition comprising an organic vehicle which upon drying forms a hard, thin, impervious film, a pigment, about .3% of tri-amyl amine and about .25% of orthochloraniline, each of said amines having a vapor pressure less than atmospheric at 130° F., said amines being completely and homogeneously dispersed in the vehicle, said combined amines serving to improve the consistency and brushing qualities of the paint and also serving to suppress any checking tendency of the paint.

3. A paint composition comprising an organic vehicle which upon drying forms a hard, thin, impervious film, a pigment, about .3% of dibutyl amine and about .2% of aniline, each of said amines having a vapor pressure less than atmospheric at 130° F., said amines being completely and homogeneously dispersed in the vehicle, said combined amines serving to improve the consistency and brushing qualities of the paint and also serving to suppress any checking tendency of the paint.

4. A paint composition comprising an organic vehicle which upon drying forms a hard, thin, impervious film, a pigment, about .45% of di-n-butyl amino ethanol and about .5% of meta-toluidine, each of said amines having a vapor pressure less than atmospheric at 130° F., said amines being completely and homogeneously dispersed in the vehicle, said combined amines serving to improve the consistency and brushing qualities of the paint and also serving to suppress any checking tendency of the paint.

PAUL ZURCHER.